United States Patent

[11] 3,559,948

| [72] | Inventor | Marvin H. Grove<br>Houston, Tex. |
|---|---|---|
| [21] | Appl. No. | 760,832 |
| [22] | Filed | Sept. 19, 1968 |
| [45] | Patented | Feb. 2, 1971 |
| [73] | Assignee | M & J Valve Company<br>Houston, Tex.<br>a corporation of Texas |

[54] GATE VALVE CONSTRUCTION
2 Claims, 7 Drawing Figs.

| [52] | U.S. Cl. | 251/174,<br>251/328, 251/329 |
|---|---|---|
| [51] | Int. Cl. | F16k 3/16 |
| [50] | Field of Search | 251/174,<br>172, 327—329 |

[56] References Cited
UNITED STATES PATENTS

| 2,701,117 | 2/1955 | Bashark | 251/174 |
| 2,730,119 | 1/1956 | Bredtschneider | 137/454.2X |
| 2,732,170 | 1/1956 | Shand | 251/174X |
| 2,861,771 | 11/1958 | Bryant | 251/174X |
| 3,170,670 | 2/1965 | Johnstone | 251/172 |
| 3,305,213 | 2/1967 | Grove | 251/172X |

*Primary Examiner*—Clarence R. Gordon
*Attorney*—Flehr, Hohbach, Test, Albritton & Herbert

ABSTRACT: A gate valve suitable for applications where the pressure on one side of the valve is negligible or relatively low, while the pressure on the other side of the valve may be substantially higher. A resilient seal is provided between the end of the wall of the body and the gate on one side of the valve, namely that side which may have a substantial pressure applied. On the other side of the body, the body space is ported to the corresponding flow passage of the valve, whereby leakage from the higher pressure side cannot apply to the body.

PATENTED FEB 2 1971
3,559,948
SHEET 1 OF 3
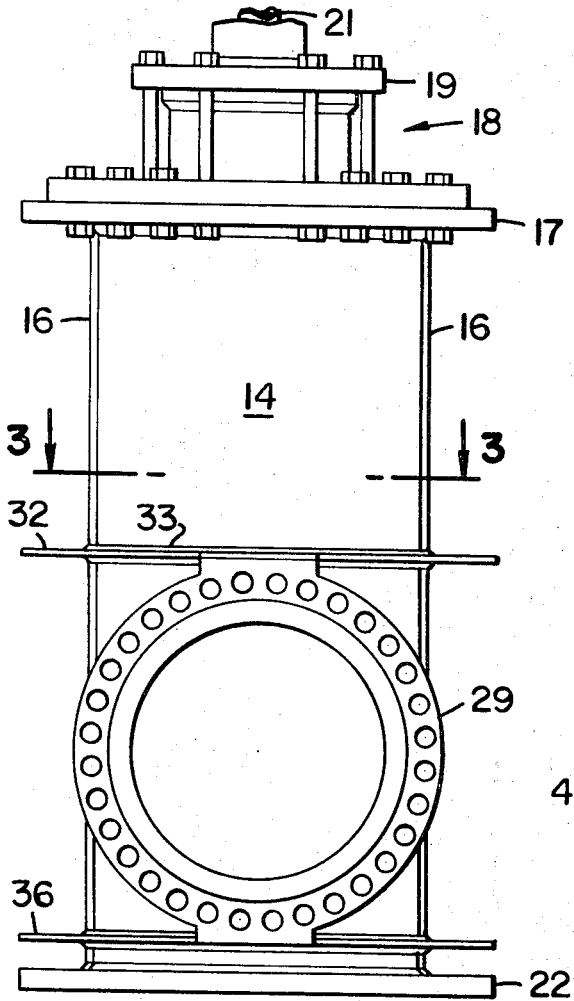
FIG_1
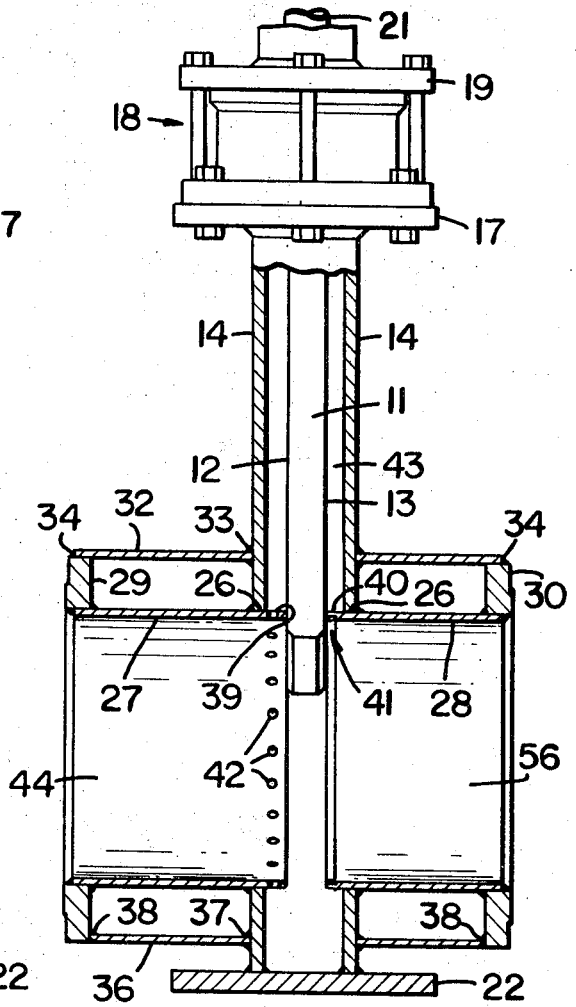
FIG_2
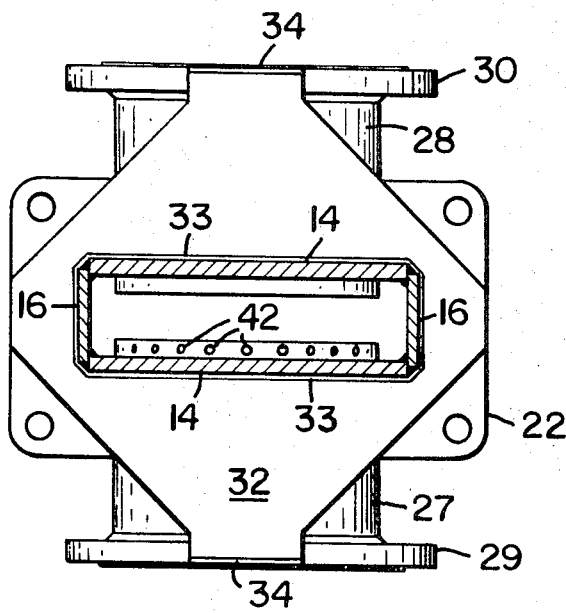
FIG_3
*INVENTOR.*
MARVIN H. GROVE
BY
Flehr, Hohbach, Test,
Albritton & Herbert
ATTORNEYS

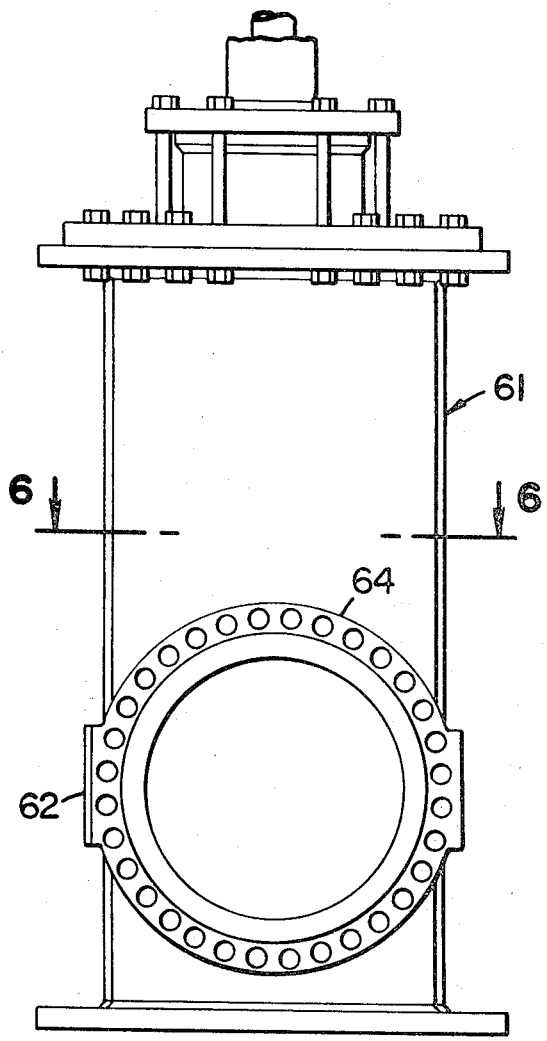
FIG_4
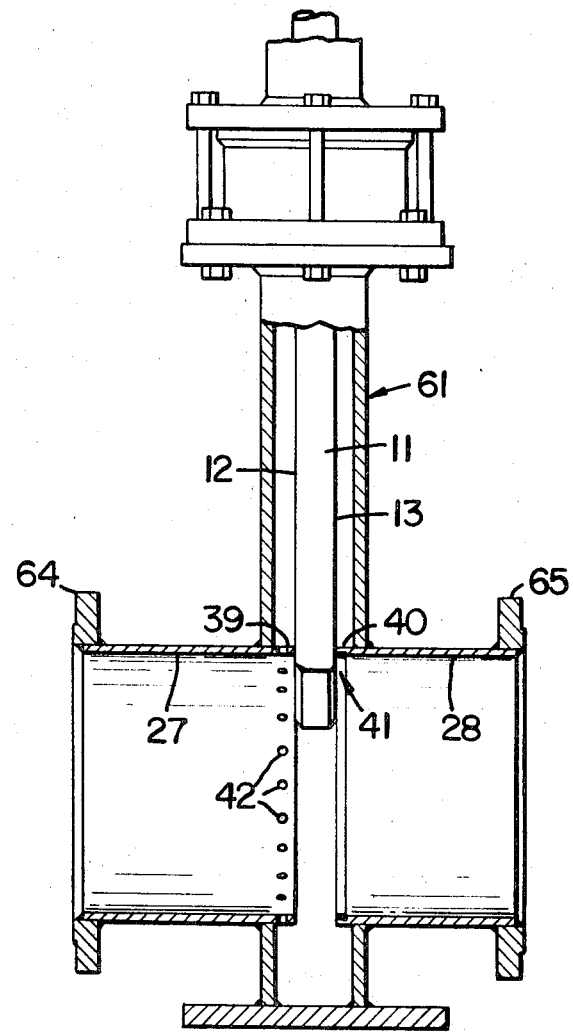
FIG_5
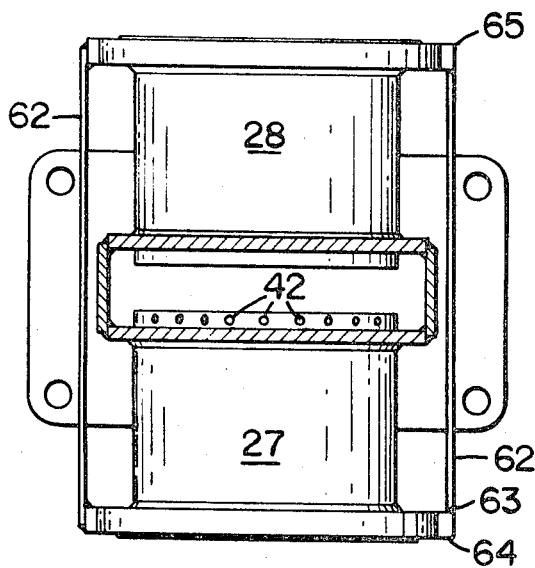
FIG_6
INVENTOR.
MARVIN H. GROVE
BY
Flehr, Hohbach, Test,
Albritton & Herbert
ATTORNEYS

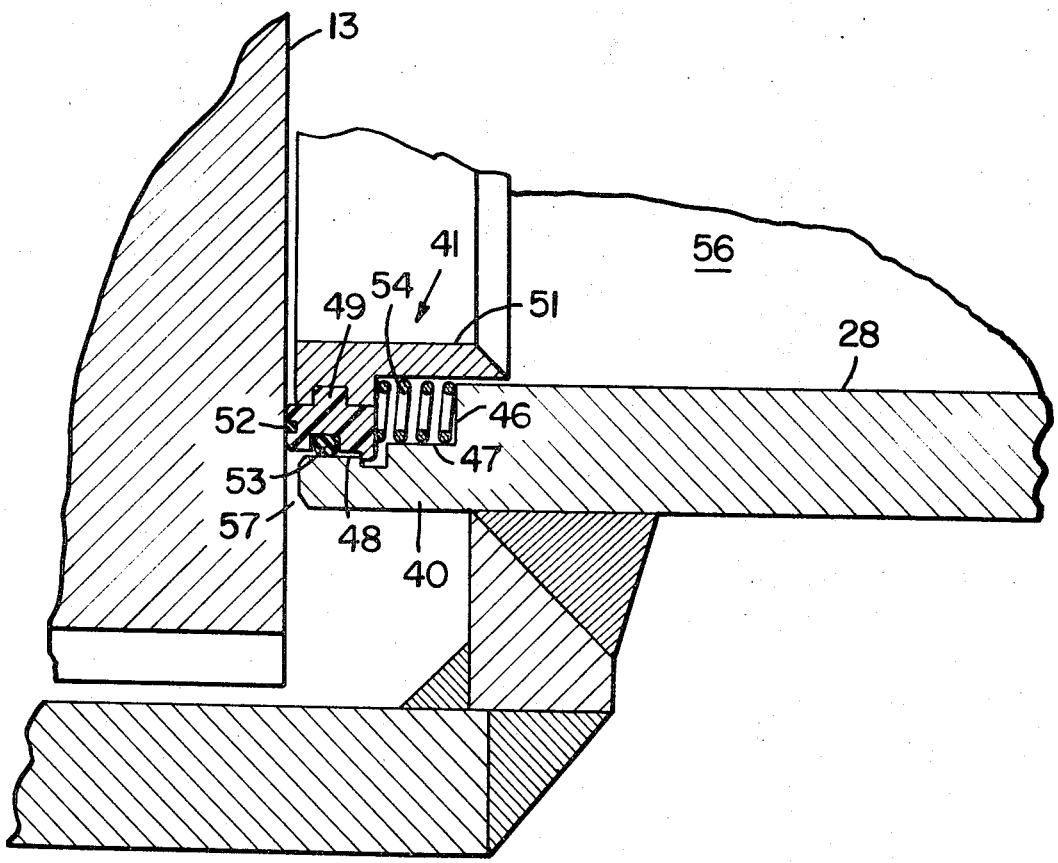
FIG_7

GATE VALVE CONSTRUCTION

BACKGROUND OF THE INVENTION

A conventional gate valve is designed with a body having sufficient strength to withstand the highest working pressure at which it is rated. Such valves (see U.S. Pat. No. 3,260,503) generally having sealing assemblies engaging the sides of the gate and surrounding the aligned flow passages. In service, the closed body space is generally under pressure which may vary with different working condition of line pressure and valve operation, and which may equal the maximum upstream line pressure. The design requirements with respect to the strength of the valve body is one of the main factors determining cost of manufacture for a valve of given size and pressure rating. While many gate valves (e.g. for pipelines) must be capable of handling both upstream and downstream working pressures for various valve conditions (e.g. open, closed or intermediate operating positions of the gate), there are some services where the pressure on one side of the valve remains relatively low, while substantially higher pressures may be developed on the other side of the valve. An example is the so-called "tank valve" such as may be installed on a tank to control flow of liquid (e.g. a petroleum product) between the tank and a pipeline. For such services, it has been the practice to employ valves of essentially the same type as described above, namely one which is constructed with a body capable of withstanding the pipeline pressures.

SUMMARY OF THE INVENTION

This invention relates generally to gate valves for controlling the flow of various fluids. It more specifically relates to so-called tank valves.

It is a general object of the invention to provide a lightweight valve suitable for tank and similar services as described above.

Another object of the invention is to provide a valve of the above character in which the body is never subjected to line pressures developed on one side of the valve.

Another object of the invention is to provide a gate valve having sufficient strength for attachment to tanks and the like but with a relatively light body construction.

Further objects and features of the invention will appear from the following description in which the preferred embodiment has been described in connection with the accompanying drawing.

The present invention consists of a gate valve body having end walls provided with a lined flow passage. A valve gate is disposed within the body and is movable between open and closed valve positions. Annular to engaging means is carried by the body on both sides of the gate. On that side of the gate which may be subject to substantial line pressures, the gate engaging means includes sealing means which establishes a seal between the gate and the adjacent portion of the body. The other engaging means forms an abutment the gate and is ported to provide free communication between the body space and the associated flow passage.

BRIEF DESCRIPTION OF THE DRAWING

FIG. 1 is an end elevation view illustrating a gate valve incorporating the invention.

FIG. 2 is a side elevation view of the valve shown in FIG. 1 but in section.

FIG. 3 is a cross-sectional view taken along the line 3—3 of FIG. 1, with the gate removed.

FIG. 4 is an end elevation view like FIG. 1, but illustrating another embodiment.

FIG. 5 is a site elevation view of the embodiment shown in FIG. 4, but in section.

FIG. 6 is a cross-sectional view taken along the line 6—6 of FIG. 4, with the gate removed.

FIG. 7 is an enlarged detail in section showing the sealing assembly on the upstream side of the gate.

DESCRIPTION OF THE PREFERRED EMBODIMENT

The gate valve shown in FIGS. 1—3 consist of a body 10 together with the flat gate 11. The surfaces 12 and 13 of the gate are flat and parallel. The body in this instance is boxlike in construction (i.e. rectangular in transverse section) and consists of the flat parallel end walls 14 together with the sidewalls 16. Such a body may be fabricated by welding from mill sheet stock. The upper end of the body is shown provided with the welded on flange 17 to which a bonnet assembly 18 is secured. The upper flange 19 of this assembly may serve to mount valve operating means 20 which may include operators of the hydraulic, electrical or pneumatic types. The operating stem 21 of the valve extends through the bonnet assembly 18 and this assembly includes sealing means about the stem to prevent leakage. The inner end of the operating rod is suitably coupled to the valve gate 11. The lower end of the body is shown provided with the welded on closure plate 22.

The end walls 14 of the body are provided with a lined opening 26 serving to accommodate the pipe hubs 27 and 28. These hubs are secured to the end valves as by welding and may carry pipe flanges 29 and 30 for making connections with associated equipment. Flange 29 may, for example, be directly coupled to the wall of a storage tank. Flange 30 may be coupled to a pipeline through which liquid is supplied to the tank.

Some reinforcement may be provided for the body. For example, upper plate 32 having a configuration such as shown in FIG. 3, may be positioned to embrace the body and to be secured to the end and sidewalls by welding 33. Portions of the plate 32 are also shown secured to the adjacent portions of the flanges 29 and 30 by welding 34. An additional similar reinforcing plate 36 can be provided near the bottom of the body. This plate is also shown embracing the lower portion of the body and secured thereto by welding 37 with portions that are secured to the flanges 29 and 30 by welding 38.

The inner annular portions 39 and 40 of hubs 27 and 28 extend between the end wall 14 and the gate 11, and terminate in proximity with the side surfaces 12 and 13 of the gate. The annular portion 40 carries an annular sealing assembly 41, which establishes a fluid tight seal between the end wall 14 and the adjacent portion of the gate. The annular portion 39 is not provided with a sealing assembly, but is provided with a plurality of ports or openings 42 which provide free fluid communication between the body space 43 surrounding the gate and the flow passage 44 formed by the hub 27.

The sealing assembly 41 may be one of several types capable of establishing good sealing contact the gate when in closed position. A suitable sealing assembly, which is similar to the sealing assembly shown in U.S. Pat. No. 3,269,695 is illustrated in FIG. 7. In this instance the annular portion 40 of the hub 28 is machined to provide an annular recess which is defined by the bottom surface 46 and the peripheral surfaces 47 and 48. The recess serves to movably accommodate a seal ring 49 which may be made of suitable resilient material such as nylon. The seal ring 49 is secured to a more rigid metal carrier ring 51. The end portion of the seal ring 49 which engages the adjacent surface of the gate may be provided with an insert 52 made of more resilient material, such as a synthetic rubber or elastomer. The ring 49 is sealed with respect to the surface of 48 by suitable means such as the resilient O-ring 53. Coiled compression springs 54 are seated upon surface 46 and serve to urge the seal ring 49 against the gate. It is desirable for pressure in the flow passage 56 formed by pipe hub 28 to act upon the sealing assembly to urge the seal ring 49 toward the gate. In this connection, it will be noted that the insert 52 and the surface 48 are on different diameters, thereby providing a fluid pressure area which is acted upon by fluid pressure in passage 56 to urge the assembly to the left as viewed in FIG. 7.

The inner end of the annular portion 40 (FIG. 7) is spaced from the adjacent surface 13 of the gate by a small gap or clearance 57. The dimensions are such that the flow area represented by the combined areas of the openings 41 (e.g. one-fourth to one-half less).

For the position of the gate illustrated in FIGS. 2 and 7, the surface 12 of the gate is in abutment with the end of the annular portion 39. Assuming that no pressure is being applied to either passages 44 or 56, the gate assumes this position because of the action of compression springs 54. Therefore, the annular gap 57 referred to in connection with FIG. 7 represents the maximum clearance which may exist between annular portion 40 and the gate surface 13, during use of the valve.

Operation of the valve described above is as follows. In a typical instance the flange 29 is directly attached to a tank wall and hub 28 and flange 30 are connected to a liquid pipe supply line. Assuming now that the gate is in its lowermost or closed position, a fluidtight seal is formed between annular portion 14 and the surface 13 of the gate, and therefore line pressure applied to flow passage 56 is carried by the exposed portion of the gate, the sealing assembly and the annular portion 40. In other words, normally such line pressure is not applied to the body space 43. On the tank side of the valve some pressure may be developed in the flow passage 44 and this pressure equalized with the body space 43 through the ports 42. Such pressure is at all times relatively low, as for example from atmospheric to 20 p.s.i. as compared to pressures developed in the connected pipeline which may range for example from 50 to 150 p.s.i. If some leakage should occur past the sealing assembly, due to a worn or mutilated seal ring 49, the flow of such leakage can in no event be greater than that afforded by the gap of 57. Since this flow area is smaller than the combined flow areas of ports 42, it will be seen that such leakage passing through the valve body, and from thence through the ports 42, cannot develop any substantial pressure in the body. When a valve is opened for the purpose of admitting liquid from the pipeline into the tank, the body space of 43 is subjected to line pressure, but the pressure under such conditions is relatively low and is not comparable to the relatively high pressures that may be developed in the pipeline when the valve is closed.

It will be evident that the valve described above greatly simplifies the strength requirements for the valve body. Thus, the body may be of relatively light construction, thus effecting a great saving in manufacturing cost. Although the body is of relatively light construction, it is sufficiently strong to withstand stresses which may be applied from equipment connected to the same. Thus, installation is simplified in that additional structural members for attaching the valve to the tank may be omitted.

In the embodiment illustrated in FIGS. 4—6, the valve body 61 is similar in construction to the body previously described. The hubs 27 and 28 are similarly applied to the body and have inner portions 39 and 40, the latter carrying the sealing assembly 41. However, in place of the upper and lower plates 32 and 36, side reinforcing plates 62 are provided. These plates have the end portions attached by welding 63 to the adjacent portions of the pipe flanges 64 and 65. This embodiment operates essentially in the same manner as the embodiment of FIGS. 1—3.

I claim:

1. In a gate valve, a valve body having end walls provided with aligned upstream and downstream flow passages and providing a closed body space, a flat valve gate within the body and movable between open and closed positions, the gate having flat parallel side surfaces, annular rigid gate engaging portions carried by the end walls of the body and surrounding the flow passages, a sealing assembly carried by that that one of said portions which surrounds the upstream flow passage and serving to form a fluidtight seal with the adjacent surface of the gate, said sealing assembly comprising a seal ring of nonmetallic resilient material serving to engage the gate and springs serving to urge the seal ring toward the gate, the other one of said annular portions surrounding the downstream flow passage forming an abutment engaging the other side of the gate, said other portion having ports communicating between the space within the valve body and the corresponding flow passage, said one annular portion terminating in spaced proximity with the gate to form a gap having an effective flow restricting area less than the combined flow area of the ports in the other annular portion, said sealing assembly forming the sole means for forming a fluid tight seal with the gate on the upstream side of the valve.

2. A valve as in claim 1 in which hubs form the upstream and downstream flow passages, the hubs being fixed within the end walls of the body and having integral extensions within the body which form said annular portions.